(12) United States Patent
Freitas

(10) Patent No.: US 12,291,400 B1
(45) Date of Patent: May 6, 2025

(54) ANTI-SPLATTER DEVICE FOR USE WITH A CONCRETE TRUCK CHUTE

(71) Applicant: Joao Freitas, Gambrills, MD (US)

(72) Inventor: Joao Freitas, Gambrills, MD (US)

( * ) Notice: Subject to any disclaimer, the term of this patent is extended or adjusted under 35 U.S.C. 154(b) by 153 days.

(21) Appl. No.: 18/203,103

(22) Filed: May 30, 2023

(51) Int. Cl.
*B65G 11/20* (2006.01)

(52) U.S. Cl.
CPC .................. *B65G 11/206* (2013.01)

(58) Field of Classification Search
CPC .............. B65G 11/206; B65G 11/20
See application file for complete search history.

(56) References Cited

U.S. PATENT DOCUMENTS

| | | | |
|---|---|---|---|
| 1,133,692 A * | 3/1915 | Adams | B65G 11/026 193/4 |
| 3,941,420 A | 3/1976 | Klasna | |
| 5,531,518 A | 7/1996 | Alves | |
| 5,605,398 A | 2/1997 | Cronquist | |
| 6,604,768 B2 | 8/2003 | Stevenson | |
| 6,868,953 B1 * | 3/2005 | Thompson | B28C 5/4262 193/6 |
| D801,765 S | 11/2017 | Gibson | |
| 11,051,507 B1 | 7/2021 | Kaps | |
| D936,285 S | 11/2021 | Ness | |

FOREIGN PATENT DOCUMENTS

| | | | | |
|---|---|---|---|---|
| GB | 711944 A | * | 7/1954 | ......... B02C 18/0092 |
| GB | 2597540 A | * | 2/2022 | ............. B07B 13/14 |

* cited by examiner

*Primary Examiner* — William R Harp
(74) *Attorney, Agent, or Firm* — Kyle A. Fletcher, Esq.

(57) ABSTRACT

The anti-splatter device for use with a concrete truck chute is a protective structure. The anti-splatter device for use with a concrete truck chute incorporates a concrete comb, a mounting bracket, and a concrete chute. The concrete comb attaches to the mounting bracket. The mounting bracket secures the concrete comb to the concrete chute. The anti-splatter device for use with a concrete truck chute forms a protected space at the location where the concrete chute is delivering concrete. The concrete comb combs the concrete as the concrete is poured such that the concrete comb prevents the concrete from splashing on objects that are not designated to receive concrete.

14 Claims, 5 Drawing Sheets

ANTI-SPLATTER DEVICE FOR USE WITH A CONCRETE TRUCK CHUTE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of means to discharge means fresh concrete. (B28C7/16)

SUMMARY OF INVENTION

The anti-splatter device for use with a concrete truck chute is a protective structure. The anti-splatter device for use with a concrete truck chute comprises a concrete comb, a mounting bracket, and a concrete chute. The concrete comb attaches to the mounting bracket. The mounting bracket secures the concrete comb to the concrete chute. The anti-splatter device for use with a concrete truck chute forms a protected space at the location where the concrete chute is delivering concrete. The concrete comb combs the concrete as the concrete is poured such that the concrete comb prevents the concrete from splashing on objects that are not designated to receive concrete.

These together with additional objects, features and advantages of the anti-splatter device for use with a concrete truck chute will be readily apparent to those of ordinary skill in the art upon reading the following detailed description of the presently preferred, but nonetheless illustrative, embodiments when taken in conjunction with the accompanying drawings.

In this respect, before explaining the current embodiments of the anti-splatter device for use with a concrete truck chute in detail, it is to be understood that the anti-splatter device for use with a concrete truck chute is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the anti-splatter device for use with a concrete truck chute.

It is therefore important that the claims be regarded as including such equivalent construction insofar as they do not depart from the spirit and scope of the anti-splatter device for use with a concrete truck chute. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
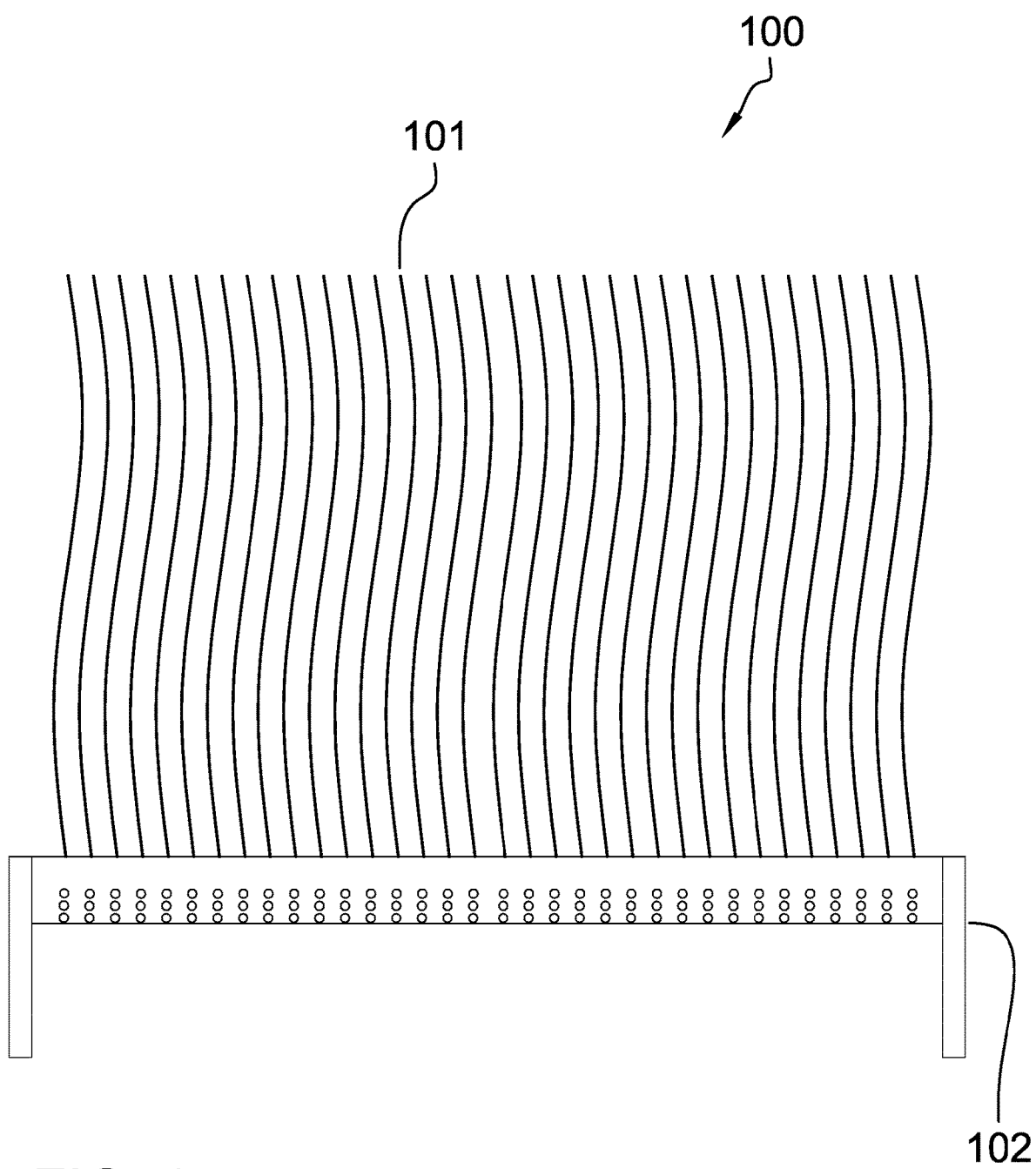
FIG. 1 is a front view of an embodiment of the disclosure.
Figure 2:
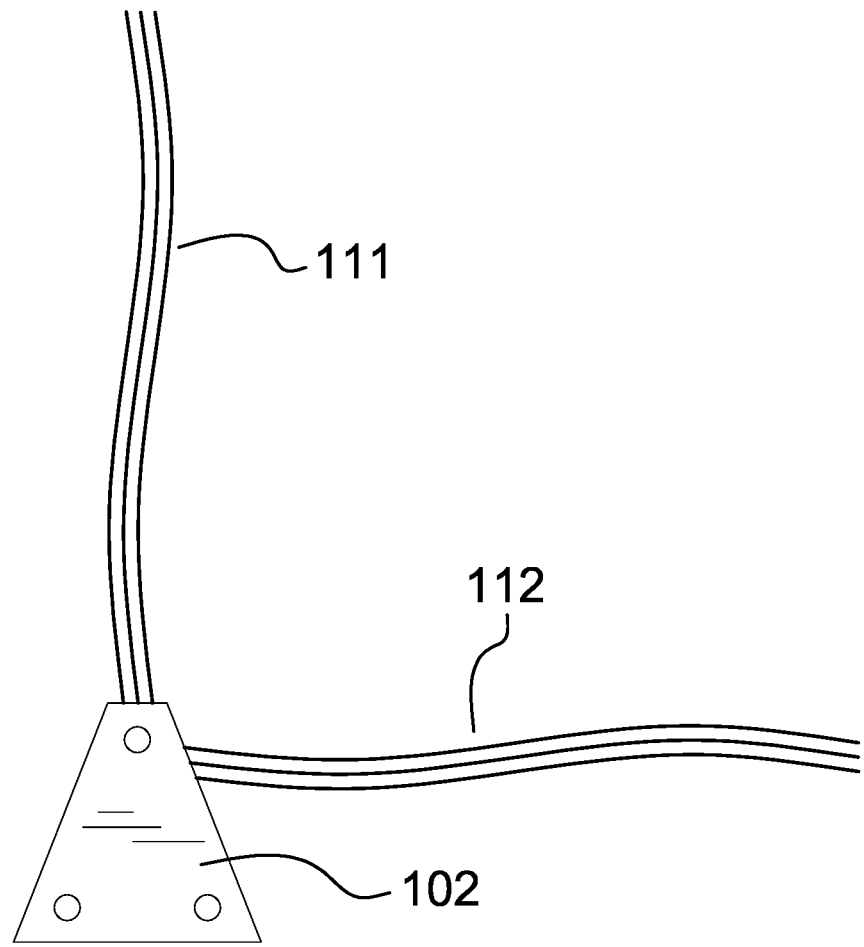
FIG. 2 is a side view of an embodiment of the disclosure.
Figure 3:
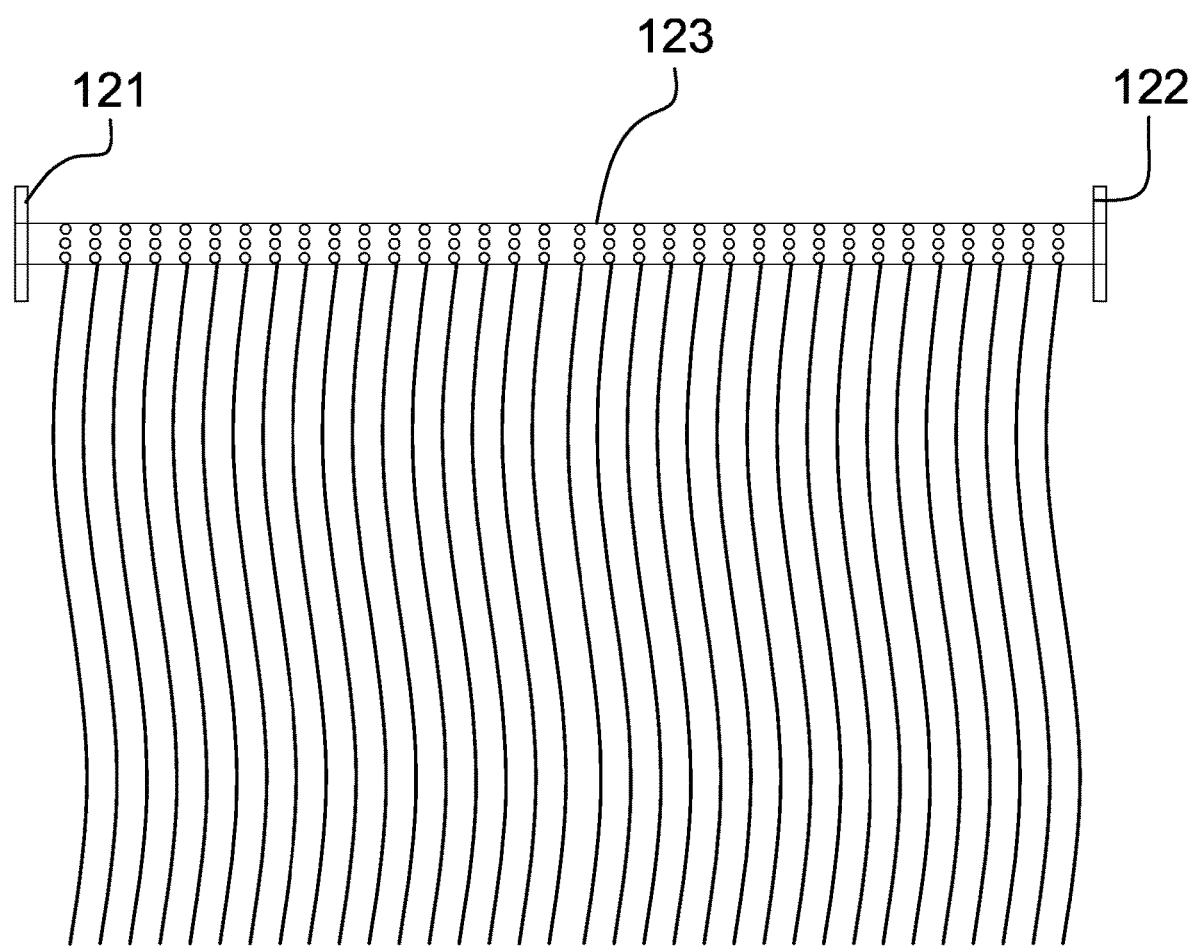
FIG. 3 is a top view of an embodiment of the disclosure.
Figure 4:
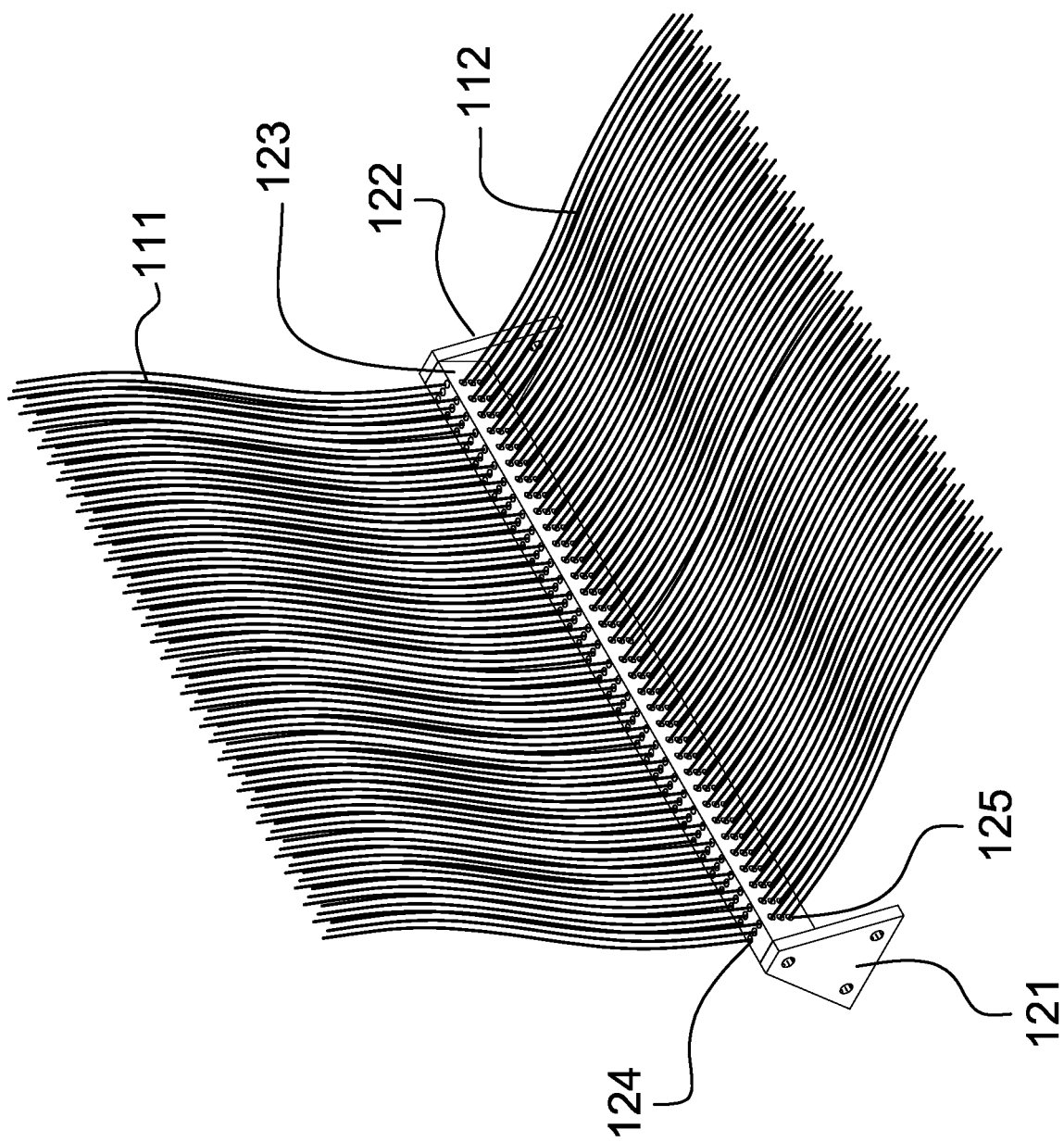
FIG. 4 is a perspective view of an embodiment of the disclosure.
Figure 5:
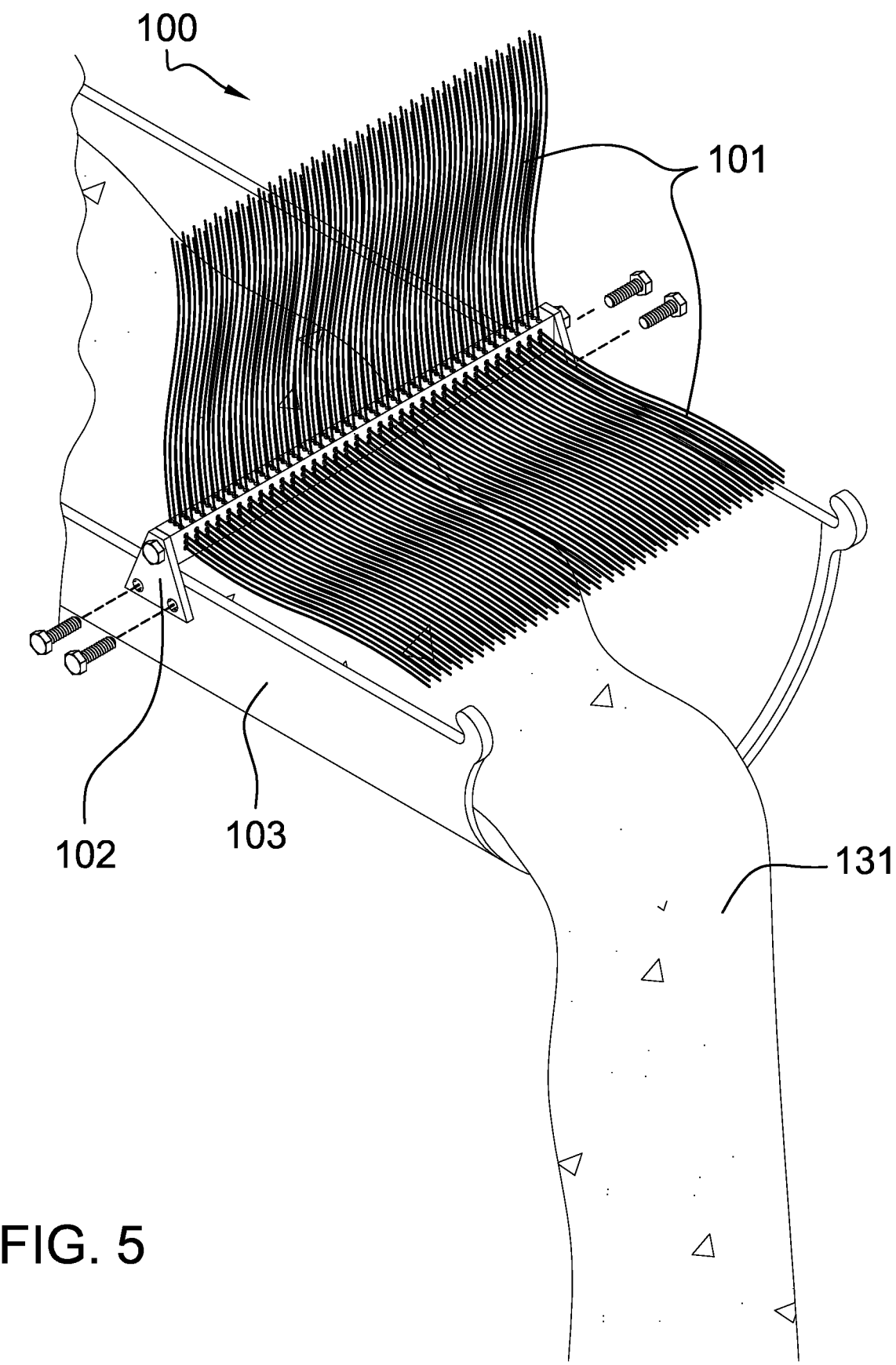
FIG. 5 is an in-use view of an embodiment of the disclosure.

Detailed reference will now be made to one or more potential embodiments of the disclosure, which are illustrated in FIGS. 1 through 5.

The anti-splatter device for use with a concrete truck chute 100 (hereinafter invention) is a protective structure. The invention 100 comprises a concrete 131 comb 101, a mounting bracket 102, and a concrete 131 chute 103. The concrete 131 comb 101 attaches to the mounting bracket 102. The mounting bracket 102 secures the concrete 131 comb 101 to the concrete chute 103. The invention 100 forms a protected space at the location where the concrete 131 chute 103 is delivering concrete 131. The concrete 131 comb 101 combs the concrete 131 as the concrete 131 is poured such that the concrete 131 comb 101 prevents the concrete 131 from splashing on objects that are not designated to receive concrete 131.

The concrete 131 chute 103 is a fluid transport structure. The concrete 131 chute 103 transports concrete 131 in a bulk solid phase to its intended location. The mounting bracket 102 attaches the concrete 131 comb 101 to the concrete 131 chute 103 such that the flow of the bulk solid phase of concrete 131 flows through the concrete 131 comb 101. The concrete 131 is defined elsewhere in this disclosure.

The concrete 131 comb 101 is a mechanical device. The concrete 131 comb 101 forms the working element of the tool formed by the invention 100. The concrete 131 comb 101 attaches to the mounting bracket 102. The mounting bracket 102 secures the concrete 131 comb 101 to the concrete 131 chute 103 such that the flow of the bulk solid phase of concrete 131 flows through the concrete 131 comb 101. The concrete 131 comb 101 aligns the bulk solid phase of concrete 131 into individual flow channels as the concrete 131 is poured into position. The concrete 131 comb 101 further forms a protective barrier that prevents the concrete 131 from splashing onto individuals working in the vicinity of the invention 100. The concrete 131 comb 101 comprises a plurality of superior teeth 111 and a plurality of inferior teeth 112.

The plurality of superior teeth 111 form a portion of the working elements of the tool formed by the invention 100. Each superior tooth selected from the plurality of superior teeth 111 attaches to the crossbeam 123 of the mounting bracket 102. Each selected superior tooth is identical. Each selected superior tooth is a disk shaped structure. Each selected superior tooth is formed with a non-Euclidean shape. The plurality of superior teeth 111 attach to the crossbeam 123 such that the congruent ends of any first superior tooth selected from the plurality of superior teeth 111 are parallel to the congruent ends of any second superior tooth selected from the plurality of superior teeth 111.

Each superior tooth selected from the plurality of superior teeth 111 forms a comb structure. The bulk solid phase of concrete 131 flowing out of the concrete 131 chute 103 flows between the plurality of superior teeth 111 as it is poured into its intended destination. The space between any two adjacent superior teeth selected from the plurality of superior teeth 111 are spaced such that the plurality of superior teeth 111 forms a barrier that captures the bulk solid phase of concrete 131 before it can splash into the protected space. The plurality of superior teeth 111 protects the superior portion of the protected space formed by the concrete 131 comb 101.

The plurality of inferior teeth 112 form the balance of the working elements of the tool formed by the invention 100. Each inferior tooth selected from the plurality of inferior teeth 112 attaches to the crossbeam 123 of the mounting bracket 102. Each selected inferior tooth is identical. Each selected inferior tooth is a disk shaped structure. Each selected inferior tooth is formed with a non-Euclidean shape. The plurality of inferior teeth 112 attach to the crossbeam 123 such that the congruent ends of any first inferior tooth selected from the plurality of inferior teeth 112 are parallel to the congruent ends of any second inferior tooth selected from the plurality of inferior teeth 112.

Each inferior tooth selected from the plurality of inferior teeth 112 forms a comb structure. The bulk solid phase of concrete 131 flowing out of the concrete 131 chute 103 flows between the plurality of inferior teeth 112 as it is poured into its intended destination. The space between any two adjacent superior teeth selected from the plurality of inferior teeth 112 are spaced such that the plurality of inferior teeth 112 forms a barrier that captures the bulk solid phase of concrete 131 before it can splash into the protected space. The plurality of inferior teeth 112 protects the inferior portion of the protected space formed by the concrete 131 comb 101.

The plurality of superior teeth 111 and the plurality of inferior teeth 112 are positioned to be roughly perpendicular to the bulk solid phase of concrete 131. The major axes of the teeth contained in the plurality of superior teeth 111 are roughly perpendicular to the major axes of the teeth contained in the plurality of inferior teeth 112.

The mounting bracket 102 is mechanical structure. The mounting bracket 102 is a rigid structure. The mounting bracket 102 is a load bearing structure. The mounting bracket 102 attaches the concrete 131 comb 101 to the concrete 131 chute 103. The mounting bracket 102 transfers the load of the concrete 131 comb 101 to the concrete 131 chute 103. The mounting bracket 102 comprises a first mounting plate 121, a second mounting plate 122, and a crossbeam 123.

The first mounting plate 121 is a prism shaped structure. The first mounting plate 121 is a disk shaped structure. The first mounting plate 121 is a rigid structure. An initially selected congruent end of the first mounting plate 121 attaches to a first congruent end of the prism structure of the crossbeam of the mounting bracket 102. The subsequently selected congruent end of the first mounting plate 121 attaches to the concrete 131 chute 103.

The second mounting plate 122 is a prism shaped structure. The second mounting plate 122 is a disk shaped structure. The second mounting plate 122 is a rigid structure An initially selected congruent end of the second mounting plate 122 attaches to a second congruent end of the prism structure of the crossbeam 123 of the mounting bracket 102. The subsequently selected congruent end of the second mounting plate 122 attaches to the concrete 131 chute 103.

The crossbeam 123 is a prism shaped structure. The crossbeam 123 is a rigid structure. The crossbeam 123 is a load bearing structure. The crossbeam 123 further comprises a superior teeth mount 124 and an inferior teeth mount 125. The superior teeth mount 124 is a fastening structure that is formed on the lateral face of the prism structure of the crossbeam 123. The superior teeth mount 124 secures the plurality of superior teeth 111 to the crossbeam 123. The inferior teeth mount 125 is a fastening structure that is formed on the lateral face of the prism structure of the crossbeam 123. The inferior teeth mount 125 secures the plurality of inferior teeth 112 to the crossbeam 123.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Barrier: As used in this disclosure, a barrier is a physical obstacle that forms a boundary between a first space and a second space. The barrier prevents the passage of an object between the first space and the second space.

Bracket: As used in this disclosure, a bracket is a mechanical structure that attaches a second structure to a first structure such that the load path of the second structure is fully transferred to the first structure.

Bristle: As used in this disclosure, a bristle is a short coarse stiff hair or hair like object.

Bulk Solid: As used in this disclosure, a bulk solid is a material that is formed from an accumulation of discrete particles. While the discrete particles of the bulk solid are solid materials, in aggregate the physical performance of bulk solid will exhibit fluid characteristics such as flow or taking the shape of a container.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Comb: As used in this disclosure, a comb is a toothed device that is used for arranging loose objects such as bulk solids or hair. The comb comprises a base structure from which project a plurality of teeth. Each of the plurality of teeth is a rod that projects away from the base structure. The loose objects pass between the diastema between each pair of adjacent teeth selected from the plurality of teeth.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Cement and Concrete: As used in this disclosure, concrete refers to a solid material formed from a bulk solid (commonly called the aggregate) that is bound into the solid material with a binding material (commonly called cement). Cement and Concrete are amongst the most commonly used construction materials.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Euclidean Surface: As used in this disclosure, a Euclidean surface refers to a two-dimensional plane that is formed without a curvature. By without a curvature is meant that the shortest distance between any two points on a Euclidean surface forms a line that remains on the Euclidean surface.

Exterior: As used in this disclosure, the exterior is used as a relational term that implies that an object is not contained within the boundary of a structure or a space.

Fixed and Free End: As used in this disclosure, a fixed end refers to the congruent end of a first prism shaped structure that is secured to an anchor point of a primary structure. A free end refers to the congruent end of the first prism shaped structure: a) that is distal from the fixed end; and, b) that is not secured to the primary structure. The free end of the sheeting structure can be secured to a secondary structure that is independent of the primary structure.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Force of Gravity: As used in this disclosure, the force of gravity refers to a vector that indicates the direction of the pull of gravity on an object at or near the surface of the earth.

Form Factor: As used in this disclosure, the term form factor refers to the size and shape of an object.

Gas: As used in this disclosure, a gas refers to a state (phase) of matter that is fluid and that fills the volume of the structure that contains it. Stated differently, the volume of a gas always equals the volume of its container.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Liquid: As used in this disclosure, a liquid refers to a state (phase) of matter that is fluid and that maintains, for a given pressure, a fixed volume that is independent of the volume of the container.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Major and Minor Axes (Preferred): As used in this disclosure, the major and minor axes refer to a pair of perpendicular axes that are defined within a structure. The length of the major axis is always greater than or equal to the length of the minor axis. The major axis forms the longest symmetric bifurcation of a structure selected from the group consisting of: a) the structure; or, b) the perimetrical boundary of the structure. The major and minor axes intersect at the center of the structure. The major axis is always parallel or perpendicular to an edge of a rectangular or rectilinear structure.

Mount: As used in this disclosure, a mount is a mechanical structure that attaches or incorporates an object into a load path.

Negative Space: As used in this disclosure, negative space is a method of defining an object through the use of open or empty space as the definition of the object itself, or, through the use of open or empty space to describe the boundaries of an object.

Non-Euclidean Line: A non-Euclidean line is a line that is formed with a curvature. Specifically, a non-Euclidean line comprises a set of points wherein the path of the span of the shortest distance between at least two points selected from the line does not lie on the path of the line itself. When a non-Euclidean line forms a section of the perimeter of a structure, the non-Euclidean line is often called a non-Euclidean edge.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.1 times the absolute minimum distance between the same two points.

Non-Euclidean Structure: As used in this disclosure, a non-Euclidean structure is a structure wherein: a) the non-Euclidean structure is formed with a non-Euclidean plane; b) the non-Euclidean structure has an axis that lies on a non-Euclidean plane or is otherwise formed with a curvature; or, c) a combination of both (a) and (b) above.

Not Significantly Different: As used in this disclosure, the term not significantly different compares a specified property of a first object to the corresponding property of a reference object (reference property). The specified property is considered to be not significantly different from the reference property when the absolute value of the difference between the specified property and the reference property is less than 10.0% of the reference property value. A negligible difference is considered to be not significantly different.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Phase: As used in this disclosure, phase refers to the state of the form of matter. The common states of matter are solid, liquid, gas, and plasma.

Primary Shape: As used in this disclosure, the primary shape refers to a description of the rough overall geometric shape of an object that is assembled from multiple components or surfaces.

Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a negative space within which an object is stored. The protected space is enclosed by a barrier structure that: a) prevents damage to the object contained within the protected space; b) maintains conditions that are appropriate for the object; c) protects the object within the protected space from potential dangers that are outside of the protected space; or, d) maintains the privacy of the object within the protected space.

Roughly: As used in this disclosure, roughly refers to a comparison between two objects. Roughly means that the difference between one or more parameters of the two compared objects are not significantly different.

Solid: As used in this disclosure, a solid refers to a state (phase) of matter that: 1) has a fixed volume; and, 2) does not flow.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Teeth: As used in this disclosure, the teeth refer to a plurality of working elements of a tool that interact with an object in order to cut or align the object. An individual working element selected form the plurality of working elements is called a tooth.

Tool: As used in this disclosure, a tool is a device, an apparatus, or an instrument that is used to carry out an activity, operation, or procedure. A tool generally comprises a working element and a handle. The handle of a tool that forms a sub-component of a larger structure is referred to as a mount.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Vicinity: As used in this disclosure, vicinity refers to the space immediately, or closely, surrounding a first object. A second object is said to be in the vicinity of the first object.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An anti-splatter device for use with concrete comprising
- a concrete comb, a mounting bracket, and a concrete chute;
- wherein the concrete comb attaches to the mounting bracket;
- wherein the mounting bracket secures the concrete comb to the concrete chute;
- wherein the anti-splatter device for use with concrete forms a protected space at the location where the concrete chute is delivering concrete;
- wherein the concrete comb combs the concrete as the concrete is poured such that the concrete comb prevents the concrete from splashing on objects that are not designated to receive concrete;
- wherein the concrete comb comprises a plurality of superior teeth and a plurality of inferior teeth;
- wherein the plurality of superior teeth are positioned to be perpendicular to the bulk solid phase of concrete;
- wherein the plurality of inferior teeth are parallel to the bulk solid phase of concrete.

2. The anti-splatter device for use with concrete according to claim 1
- wherein the anti-splatter device for use with concrete is a protective structure.

3. The anti-splatter device for use with concrete according to claim 2
- wherein the concrete chute is a fluid transport structure;
- wherein the concrete chute transports concrete in a bulk solid phase to its intended location;
- wherein the mounting bracket attaches the concrete comb to the concrete chute such that the flow of the bulk solid phase of concrete flows through the concrete comb.

4. The anti-splatter device for use with concrete according to claim 3
- wherein the concrete comb is a mechanical device;
- wherein the concrete comb forms a working element of a tool formed by the anti-splatter device for use with concrete;
- wherein the concrete comb attaches to the mounting bracket;

wherein the mounting bracket secures the concrete comb to the concrete chute such that the flow of the bulk solid phase of concrete flows through the concrete comb;

wherein the concrete comb aligns the bulk solid phase of concrete into individual flow channels as the concrete is poured into position;

wherein the concrete comb further forms a protective barrier that prevents the concrete from splashing onto individuals working in the vicinity of the anti-splatter device for use with concrete.

5. The anti-splatter device for use with concrete according to claim 4 wherein the mounting bracket is mechanical structure;

wherein the mounting bracket is a rigid structure;

wherein the mounting bracket is a load bearing structure;

wherein the mounting bracket attaches the concrete comb to the concrete chute;

wherein the mounting bracket transfers the load of the concrete to the concrete chute.

6. The anti-splatter device for use with concrete according to claim 5 wherein the plurality of superior teeth form a portion of the working elements of the tool formed by the anti-splatter device for use with concrete;

wherein the plurality of inferior teeth form the balance of the working elements of the tool formed by the anti-splatter device for use with concrete.

7. The anti-splatter device for use with concrete according to claim 6 wherein the mounting bracket comprises a first mounting plate, a second mounting plate, and a crossbeam;

wherein the first mounting plate attaches to the crossbeam;

wherein the second mounting plate attaches to the crossbeam.

8. The anti-splatter device for use with concrete according to claim 7 wherein each selected superior tooth is identical;

wherein the plurality of superior teeth attach to the crossbeam such that any first superior tooth selected from the plurality of superior teeth is parallel to any second superior tooth selected from the plurality of superior teeth;

wherein each superior tooth selected from the plurality of superior teeth forms a comb structure;

wherein the bulk solid phase of concrete flowing out of the concrete chute flows between the plurality of superior teeth as it is poured into its intended destination;

wherein the space between any two adjacent superior teeth selected from the plurality of superior teeth are spaced such that the plurality of superior teeth limits the bulk solid phase of concrete before it can splash into the protected space.

9. The anti-splatter device for use with concrete according to claim 8 wherein each selected inferior tooth is identical;

wherein the plurality of inferior teeth attach to the crossbeam such that any first inferior tooth selected from the plurality of inferior teeth is parallel to any second inferior tooth selected from the plurality of inferior teeth;

wherein each inferior tooth selected from the plurality of inferior teeth forms a comb structure;

wherein the bulk solid phase of concrete flowing out of the concrete chute flows between the plurality of inferior teeth as it is poured into its intended destination;

wherein the space between any two adjacent superior teeth selected from the plurality of inferior teeth are spaced such that the plurality of inferior teeth limits flow of the bulk solid phase of concrete before it can splash into the protected space;

wherein the plurality of inferior teeth protects the inferior portion of the protected space formed by the concrete comb.

10. The anti-splatter device for use with concrete according to claim 9 wherein the major axes of the teeth contained in the plurality of superior teeth are roughly perpendicular to the major axes of the teeth contained in the plurality of inferior teeth.

11. The anti-splatter device for use with concrete according to claim 10 wherein each superior tooth selected from the plurality of superior teeth attaches to the crossbeam of the mounting bracket;

wherein each inferior tooth selected from the plurality of inferior teeth attaches to the crossbeam of the mounting bracket.

12. The anti-splatter device for use with concrete according to claim 11 wherein the first mounting plate is a rigid structure;

wherein the first mounting plate attaches to the crossbeam of the mounting bracket;

wherein the first mounting plate attaches to the concrete chute.

13. The anti-splatter device for use with concrete according to claim 12 wherein the second mounting plate is a rigid structure;

wherein the second mounting plate attaches to the crossbeam of the mounting bracket that is distal from the first mounting plate;

wherein the second mounting plate attaches to the concrete chute.

14. The anti-splatter device for use with concrete according to claim 13 wherein the crossbeam is a rigid structure;

wherein the crossbeam further comprises a superior teeth mount and an inferior teeth mount;

wherein the superior teeth mount is a fastening structure that is formed on the lateral face of the crossbeam;

wherein the superior teeth mount secures the plurality of superior teeth to the crossbeam;

wherein the inferior teeth mount is a fastening structure that is formed on the lateral face of the crossbeam;

wherein the inferior teeth mount secures the plurality of inferior teeth to the crossbeam.

* * * * *